(12) United States Patent
Kazama et al.

(10) Patent No.: US 11,092,831 B2
(45) Date of Patent: Aug. 17, 2021

(54) IMAGE DISPLAY APPARATUS

(71) Applicant: Panasonic Intellectual Property Management Co., Ltd., Osaka (JP)

(72) Inventors: Masato Kazama, Osaka (JP); Kazuya Honda, Osaka (JP); Yoshirou Kawasoe, Osaka (JP); Taizou Takeuchi, Osaka (JP); Takafumi Umitani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/094,289

(22) PCT Filed: Feb. 6, 2018

(86) PCT No.: PCT/JP2018/004001
§ 371 (c)(1),
(2) Date: Oct. 17, 2018

(87) PCT Pub. No.: WO2018/147270
PCT Pub. Date: Aug. 16, 2018

(65) Prior Publication Data
US 2019/0137809 A1  May 9, 2019

Related U.S. Application Data

(60) Provisional application No. 62/456,846, filed on Feb. 9, 2017.

(30) Foreign Application Priority Data

Aug. 24, 2017  (JP) .............................. JP2017-161413

(51) Int. Cl.
*G02F 1/1333* (2006.01)

(52) U.S. Cl.
CPC .... *G02F 1/133308* (2013.01); *G02F 1/13332* (2021.01); *G02F 1/133314* (2021.01); *G02F 1/133328* (2021.01)

(58) Field of Classification Search
CPC ................................................. G02F 1/133308
See application file for complete search history.

(56) References Cited

U.S. PATENT DOCUMENTS 4,701,801 A * 10/1987 Hobbins ............... H01J 29/868
                                                    174/350
6,817,919 B1 * 11/2004 Sato ........................ H01J 9/142
                                                    313/407
(Continued)

FOREIGN PATENT DOCUMENTS

JP       2003-022030 A     1/2003
JP       2008-009164 A     1/2008
(Continued)

OTHER PUBLICATIONS

International Search Report issued in Application No. PCT/JP2018/004001 dated Apr. 24, 2018, with English translation.

*Primary Examiner* — James Wu
*Assistant Examiner* — Christopher L Augustin
(74) *Attorney, Agent, or Firm* — McDermott Will & Emery LLP

(57) ABSTRACT

A liquid crystal module includes a display panel, a back frame, a bezel, and a molded frame. The bezel includes an R_cover component and a B_cover component that are separate from each other. The R_cover component and the B_cover component each include a first conductor disposed on a surface of a front surface region facing the display panel; and a first extension section that extends to a position at which the first extension section is in contact with the back frame. A second conductor that overlaps a joint of the R_cover component and the B_cover component in a front (Continued)

view is disposed on molded frame; and a second extension section that extends to a position at which the second extension section is in contact with the back frame.

6 Claims, 11 Drawing Sheets

(56) References Cited

U.S. PATENT DOCUMENTS

| | | | | |
|---|---|---|---|---|
| 7,924,360 B2* | 4/2011 | Cheng | ............... | G02F 1/133308 348/836 |
| 8,208,089 B2* | 6/2012 | Hsiao | ................ | G02F 1/133602 349/58 |
| 8,861,197 B2* | 10/2014 | Tsai | ...................... | G06F 1/1681 349/58 |
| 9,207,710 B2* | 12/2015 | Huang | ............. | G02F 1/133308 |
| 9,442,318 B2* | 9/2016 | Lee | ................... | G02F 1/133308 |
| 2002/0135294 A1* | 9/2002 | Fujishiro | ........... | G02F 1/133308 313/493 |
| 2003/0218702 A1* | 11/2003 | Kwon | .................. | G02B 6/0086 349/65 |
| 2006/0066768 A1* | 3/2006 | Lee | .................. | G02F 1/133308 349/58 |
| 2007/0273809 A1* | 11/2007 | Lee | .................. | G02F 1/133308 349/58 |
| 2008/0239197 A1* | 10/2008 | Kasuga | ............ | G02F 1/133308 349/59 |
| 2010/0265638 A1* | 10/2010 | Sakamoto | .............. | F16M 11/08 361/679.01 |
| 2011/0292315 A1* | 12/2011 | Bae | ...................... | G02B 6/0088 349/58 |
| 2012/0162875 A1* | 6/2012 | Shimomichi | .......... | G06F 1/1601 361/679.01 |
| 2012/0204461 A1* | 8/2012 | Takeuchi | .......... | G02F 1/133308 40/737 |
| 2013/0286624 A1* | 10/2013 | Lee | ................... | G02F 1/133308 361/807 |
| 2014/0023427 A1* | 1/2014 | Okamura | .................. | F16B 5/12 403/28 |
| 2014/0055713 A1* | 2/2014 | Kuroyanagi | ...... | G02F 1/133308 349/58 |
| 2014/0139784 A1* | 5/2014 | Kawada | .......... | G02F 1/133308 349/58 |
| 2014/0307217 A1* | 10/2014 | Nakano | ............. | G02F 1/133382 349/161 |
| 2015/0234226 A1* | 8/2015 | Ikuta | ................ | G02F 1/133308 348/794 |
| 2015/0277179 A1* | 10/2015 | Nishi | ................... | G02B 6/0088 349/58 |
| 2015/0373857 A1* | 12/2015 | Chikazawa | .............. | H04N 5/66 348/726 |
| 2016/0085112 A1* | 3/2016 | Takase | .................... | F21V 15/01 349/58 |

FOREIGN PATENT DOCUMENTS

| | | |
|---|---|---|
| JP | 2009-159531 A | 7/2009 |
| JP | 2010-008795 A | 1/2010 |
| JP | 2015-072372 A | 4/2015 |

* cited by examiner

IMAGE DISPLAY APPARATUS

RELATED APPLICATIONS

This application is the U.S. National Phase under 35 U.S.C. § 371 of International Application No. PCT/JP2018/004001, filed on Feb. 6, 2018, which claims the benefit of Japanese Application No. 2017-161413, filed on Aug. 24, 2017, and which claims the benefit of U.S. Provisional Application 62/456,846, filed Feb. 9, 2017, the disclosures of which Applications are incorporated by reference herein.

TECHNICAL FIELD

The present disclosure relates to image display apparatuses that include a display panel such as a liquid crystal cell.

BACKGROUND ART

Patent Literature (PTL) 1 discloses an image display apparatus including a panel that displays an image, a chassis that supports the panel on the front surface, a plurality of circuit boards that are fixed to the back surface of the chassis, and a front cover and a back cover that retain the panel, the chassis, and the plurality of circuit boards in the interior of the image display apparatus.

CITATION LIST

Patent Literature

PTL 1: Japanese Unexamined Patent Application Publication No. 2008-9164.

SUMMARY OF THE INVENTION

Technical Problem

The present disclosure provides a display apparatus that enables a frame to be made thinner, and that can be manufactured more efficiently.

Solution to Problem

An image display apparatus according to the present disclosure includes: a display panel that displays an image on a front surface; a back frame disposed behind the display panel; a bezel disposed along outer edges of the display panel, the bezel including a front surface region disposed frontward of the display panel and being fixed to the back frame; and a molded frame disposed along the outer edges of the display panel, the molded frame supporting the display panel from behind. The bezel includes a first cover component and a second cover component that are separate from each other and correspond to two adjacent sides of the display in the front view, the second cover component being connected to an end portion of the first cover component. The first cover component and the second cover component each include a first conductor disposed on a surface of the front surface region facing the display panel, the first conductor including a first extension section that extends to a position at which the first extension section is in contact with the back frame. A second conductor that overlaps a joint of the first cover component and the second cover component in the front view is disposed on the molded frame, the second conductor including a second extension section that extends to a position at which the second extension section is in contact with the back frame.

Advantageous Effects of Invention

The present disclosure enables an image display apparatus to have a thinner frame and to be manufactured more efficiently.

DESCRIPTION OF EXEMPLARY EMBODIMENT

Figure 1:
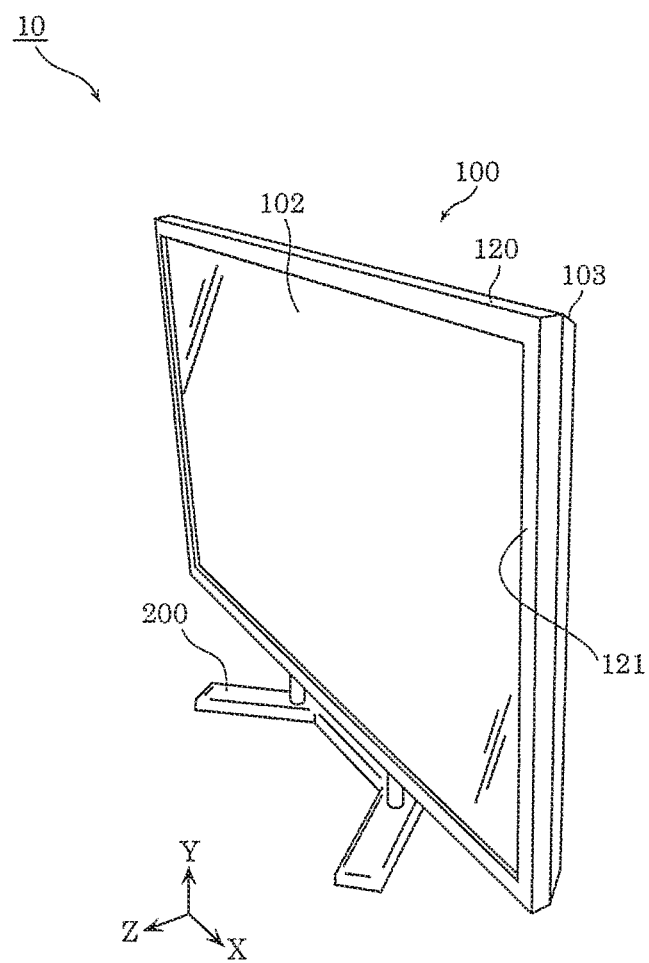
FIG. 1 is an external perspective view of an image display apparatus according to an embodiment.

The inventors have identified the following problems regarding conventional image display apparatuses. Conventional image display apparatuses such as liquid crystal televisions include a bezel that covers a periphery of a display panel that is, for example, a liquid crystal panel. The image display apparatuses employ a rectangular ring component as the bezel such as, for example, a front cover in PTL 1.

Such rectangular ring-shaped bezels tend to have a smaller border width (width of frame) in a front view due to a demand for thinner frames, and an overall larger size due to a demand for larger display panels. As a result, for example, problems concerning an increase in handling issues of the bezel during a manufacturing process of the image display apparatus, a reduction in space efficiency when storing multiple bezels, or a reduction in transport efficiency when transporting multiple bezels may arise.

Accordingly, for example, by splitting up the rectangular ring-shaped bezel into a plurality of long cover components, handling of the bezel could be made easier. Moreover, in this case, for example, a structure can be used in which outer edges of components such as the display panel and a back frame are accommodated inside of a U-shaped cross-section of the bezel. With this, screws that are necessary when splitting up the bezel front to back are, for example, no longer necessary, and as a result, the frame can, for example, easily be made thinner.

However, the bezel generally needs a conductor (for example, conductive tape) disposed on a surface facing the display panel for eliminating static electricity applied to the display panel. Therefore, when the bezel consists of a plurality of cover components, the conductive tape also needs to be split up for each cover component; and in this case, a means to efficiently discharge an electric load accumulated in the conductive tape of each cover component, for example, becomes necessary. Moreover, a problem of how to guarantee the elimination of static electricity in seams of the conductive tape may also arise. Furthermore, when the bezel consists of multiple cover components, light leakage from the seams of the cover components, for example might also occur.

Of course, in order to solve these problems, new materials (for example, tape that masks the seams of the cover components) can be used, but in this case, other problems may arise such as complications in the manufacturing process or component management.

The present disclosure is based on these observations, and as a result of deliberate study, the inventors were able to conceptualize a structure of the image display apparatus that enables the frame to be made thinner and that can be manufactured more efficiently.

Hereinafter, an embodiment will be described in detail with reference to the drawings when appropriate. However, unnecessarily detailed description may be omitted. For example, detailed descriptions of well-known matters or descriptions of components that are substantially the same as components described previous thereto may be omitted. This is to avoid unnecessary redundancy and facilitate understanding of the descriptions for those skilled in the art.

Note that the accompanying drawings and subsequent description are provided by the inventors of the present invention to facilitate sufficient understanding of the present disclosure by those skilled in the art, and are thus not intended to limit the scope of the subject matter recited in the claims.

Moreover, in the subsequent embodiment, the top-bottom direction is represented by a Y-axis, the front-back direction is represented by a Z-axis, and the left-right direction is represented by the X-axis for the sake of description, but these do not limit the orientation of the image display apparatus according to the present disclosure at the time of manufacture or usage. In the subsequent descriptions, for example, the X-plus axis indicates the direction of the arrow of the X-axis and the X-minus axis indicates the direction opposite of the X-plus axis. The same applies to the Y-axis and the Z-axis.

Hereinafter, the embodiment will be described with reference to FIG. 1 to FIG. 13B. A configuration outline of the image display apparatus according to the embodiment will first be described with reference to FIG. 1 and FIG. 2.

(1-1. Configuration Outline of Image Display Apparatus)

Figure 2:
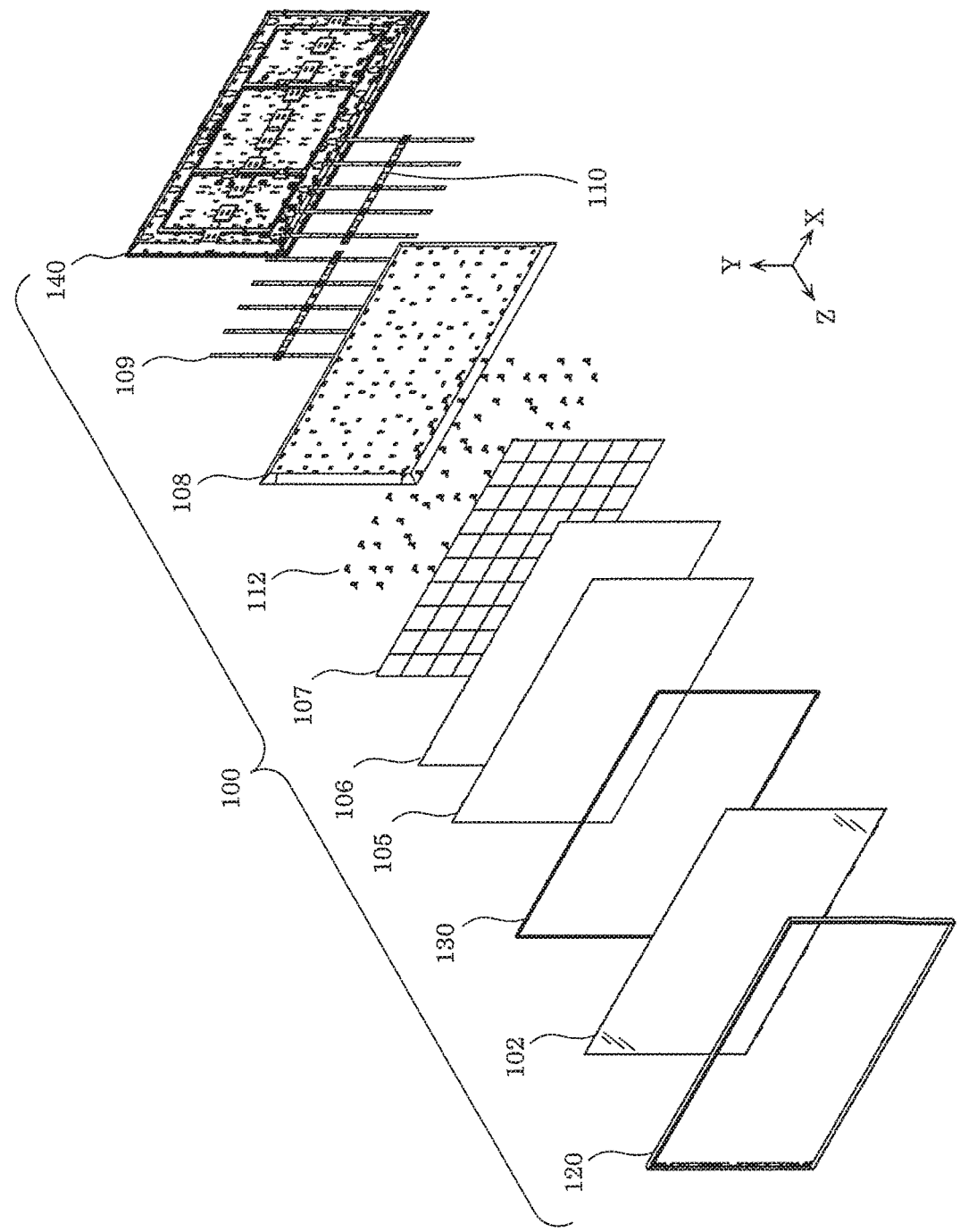
FIG. 2 is an exploded perspective view of a liquid crystal module according to the embodiment.

FIG. 1 is an external perspective view of image display apparatus 10 according to the embodiment. FIG. 2 is an exploded perspective view of liquid crystal module 100 according to the embodiment.

As illustrated in FIG. 1, image display apparatus 10 according to the present embodiment includes liquid crystal module 100, back cover 103, and stand 200 that supports liquid crystal module 100.

Liquid crystal module 100 is an apparatus that displays a still image and a moving image, and includes display panel 102 and bezel 120 along the outer edges of display panel 102. Display panel 102 in the present embodiment is a so-called liquid crystal cell in which liquid crystals are injected between a plurality of glass slides. Display panel 102 is caused to display an image based on an image signal input by liquid crystal module 100.

Bezel 120, as illustrated in FIG. 1, includes front surface region 121 disposed frontward of display panel 102, and is fixed to back frame 140 (see FIG. 2). In other words, bezel 120 protects the periphery of elements such as display panel 102, and forms a bezel (frame) with front surface region 121. In the present embodiment, a resin such as polycarbonate (PC) is used for a material of bezel 120. Bezel 120 and back frame 140 clamp together a plurality of components from display panel 102 to back frame 140.

Back cover 103 covers a back surface of liquid crystal module 100 and is made of the same resin, such as PC, as bezel 120. Note that back cover 103 may be considered a part of liquid crystal module 100.

Liquid crystal module 100, having the above configuration, further includes, as illustrated in FIG. 2, molded frame 130, optical sheet unit 105 including 2-3 optical sheets, diffuser panel 106, luminance-uniforming sheet 107, reflection sheet 108, LED sheet 109, relay sheet 110, back frame 140, and support pins 112.

Molded frame 130 supports display panel 102, and molded frame 130 and back frame 140 clamp together a plurality of components (so-called backlights) from optical sheet unit 105 to LED sheet 109 and relay sheet 110. A material of molded frame 130 is preferably a resin.

Optical sheet unit 105 consists of 2-3 types of sheets with different optical properties placed on top of each other. Optical sheet unit 105 includes, for example, a vertical prism sheet, a horizontal prism sheet, and a diffuser sheet.

Diffuser panel 106 diffuses light from a plurality of LEDs on LED sheet 109. Luminance-uniforming sheet 107 equalizes the light from the plurality of LEDs on LED sheet 109. Luminance-uniforming sheet 107 includes a plurality of holes with different diameters. To be specific, luminance-uniforming sheet 107 includes holes with exceedingly small diameters directly above each of the plurality of LEDs, and the diameters of the holes grow bigger according as the LEDs are further away from the holes. Luminance-uniforming sheet 107, according to the above configuration, smoothes the orientation of the light from each LED.

Diffuser panel 106 further diffuses the light from each LED of which the orientation is smoothed by luminance-uniforming sheet 107, and thus light emitted from diffuser panel 106 has less luminance unevenness.

Holes that correspond with the plurality of LEDs on LED sheet 109 are disposed on reflection sheet 108. LED sheet 109 is a flexible printed circuit board (FPC) that includes the plurality of LEDs. One of two main surfaces of the FPC includes a reflection layer whose surface includes the plurality of LEDs. Relay sheet 110 is an FPC that includes an electric route for transmitting electric power, a control signal, and the like to the plurality of LEDs. Relay sheet 110 includes a reflection layer similar to LED sheet 109.

Back frame 140 is a panel-shaped component made of thin sheet metal, and supports LED sheet 109 and relay sheet 110. To be specific, after LED sheet 109 and relay sheet 110 are attached to back frame 140, reflection sheet 108 is fixed to back frame 140, exposing LEDs to each of the plurality of holes in reflection sheet 108. The light from each LED is reflected by the reflection layer on the FPC and reflection sheet 108, and emitted along the Z-plus axis. Note that back frame 140 may also be called, for example, a "base plate."

Each of the plurality of support pins 112 are attached from the front of reflection sheet 108, and the plurality of support pins 112 and back frame 140 clamp together reflection sheet 108. Support pins 112 each include a tip that is inserted into the plurality of holes in luminance-uniforming sheet 107, and a flange that supports luminance-uniforming sheet 107.

Luminance-uniforming sheet 107 includes the plurality of holes into which the tips of support pins 112 are inserted; the tips of support pins 112 are inserted into each hole, and luminance-uniforming sheet 107 is attached to back frame 140, luminance-uniforming sheet 107 being supported by the flanges of support pins 112.

Diffuser panel 106 is supported by the top (head of the tip) of support pins 112, and the outer edges of diffuser panel 106 are also supported by back frame 140.

One side of back frame 140 that is the top of image display apparatus 10 when put into place, includes a lanced tab from which optical sheet unit 105 is suspended. A tab including a rectangular hole for suspending optical sheet unit 105 from the above lanced tab is disposed on optical sheet unit 105.

In liquid crystal module 100, having the above configuration, bezel 120 and molded frame 130 each include a plurality of components that are joined together, which, for example, makes handling of both bezel 120 and molded frame 130 at the time of manufacture easier. Moreover, the frame can also be made thinner (making the shorthand width of front surface region 121 of bezel 120 smaller).

Hereinafter, the structure of bezel 120, molded frame 130, and the periphery of bezel 120 and molded frame 130 according to the embodiment will be described with reference to FIG. 3 to FIG. 13B.

(1-2. Basic Configuration of Bezel and Molded Frame)

Figure 3:
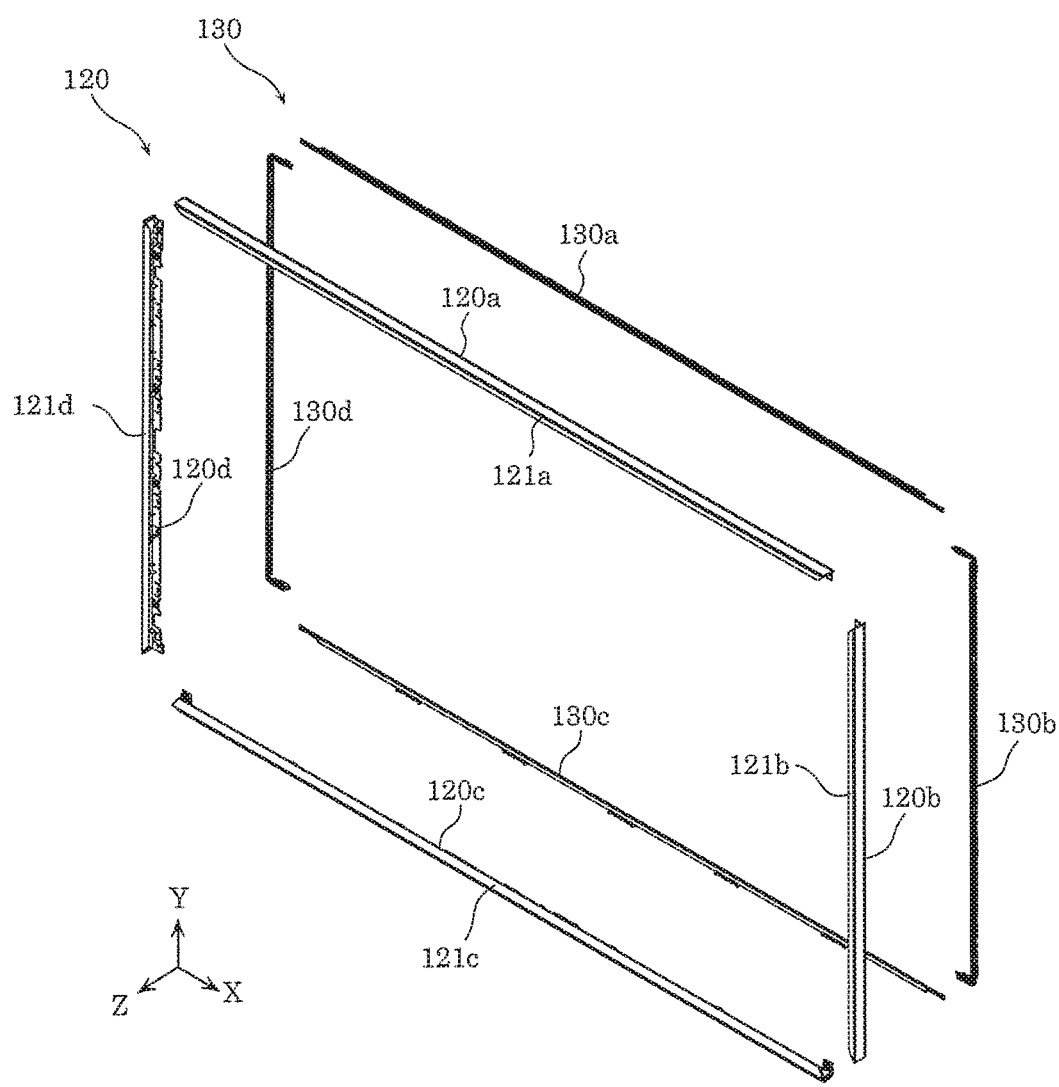
FIG. 3 is an exploded perspective view of a bezel and a molded frame according to the embodiment.

FIG. 3 is an exploded perspective view of bezel 120 and molded frame 130 according to the embodiment. As illustrated in FIG. 3, bezel 120 includes the plurality of cover components corresponding to respective sides of rectangular display panel 102 (see FIG. 2) in the front view. To be specific, bezel 120 includes T_cover component 120a on a top part, R_cover component 120b on a right side in the front view, B_cover component 120c on a bottom part, and L_cover component 120d on a left side in the front view.

One end portion of one of four cover components (120a to 120d) is attached to an adjacent other of the cover components with, for example, a screw. For example, a bottom end portion of R_cover component 120b is attached to a right end portion of B_cover component 120c with one or more screws (not illustrated in the drawings). Note that since any screws used for the attachment are arranged front-to-back (Z-axis) along an axial direction, the screws do not interfere with making the frame thinner.

Moreover, in the present embodiment, out of four cover components (120a to 120d), one of two cover components that are connected to each other is an example of a first cover component, and the other of the two cover components is an example of a second cover component. For example, when R_cover component 120b is the first cover component, T_cover component 120a or B_cover component 120c corresponds to the second cover component.

Moreover, each of four cover components (120a to 102d) are attached to back frame 140 with one or more screws (not illustrated in the drawings). With this, bezel 120 is fixed to back frame 140. Moreover, front surface regions (121a to 121d) of the respective four cover components (120a to 120d) form whole frame-shaped front surface region 121 that covers the outer edges of the front surface of display panel 102.

Moreover, molded frame 130 includes a plurality of frame components on each corresponding side of display panel 102 (see FIG. 2) similar to bezel 120. To be specific, molded frame 130 includes T_frame component 130a on the top part, R_frame component 130b on the right side in the front view, B_frame component 130c on the bottom part, L_frame component 130d on the left side in the front view.

One end portion of one of four frame components (130a to 130d) is engaged with an adjacent corresponding frame component. For example, a bottom end portion of R_frame component 130b is engaged with a right end portion of B_frame component 130c.

Moreover, each of four frame components (130a to 130d) is screwed to or engaged with back frame 140. With this, bezel 130 is fixed to back frame 140.

Note that in the present embodiment, out of four frame components (130a to 130d), one of the two frame components that are connected to each other is an example of a first frame component, and the other of the two corresponding frame components is an example of a second frame component. For example, when R_frame component 130b is the first frame component, T_frame component 130a or B_frame component 130c corresponds to the second frame component.

Moreover, in the present embodiment, a conductor for eliminating static electricity applied to display panel 102 is disposed on bezel 120 or molded frame 130 as configured above. The placement of the conductor will be described with reference to FIG. 4 to FIG. 10B.

(1-3. Configuration and Placement of Conductor)

Figure 4:
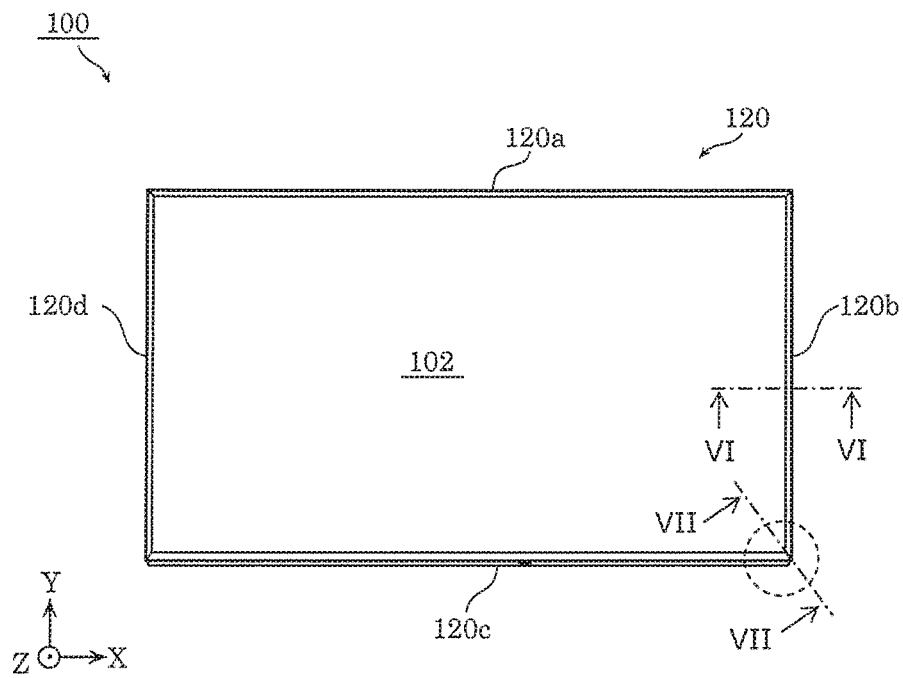
FIG. 4 is a front elevation of the liquid crystal module according to the embodiment.
Figure 5:
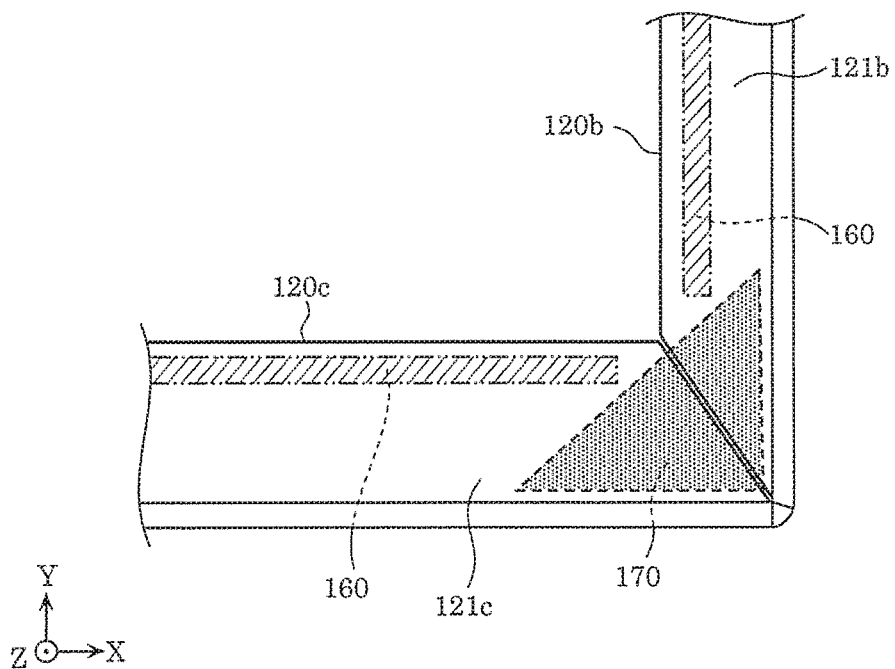
FIG. 5 is a schematic view of a position of conductors in a bottom right corner of the liquid crystal module according to the embodiment.

FIG. 4 is a front elevation of liquid crystal module 100 according to the embodiment. FIG. 5 is a schematic view of the position of the conductors in the bottom right corner of liquid crystal module 100 according to the embodiment. Note that in FIG. 5, R_cover component 120b and B_cover component 120c are shown transparent, and the approximate positions of first conductor 160 and second conductor 170 are illustrated.

Figure 6:
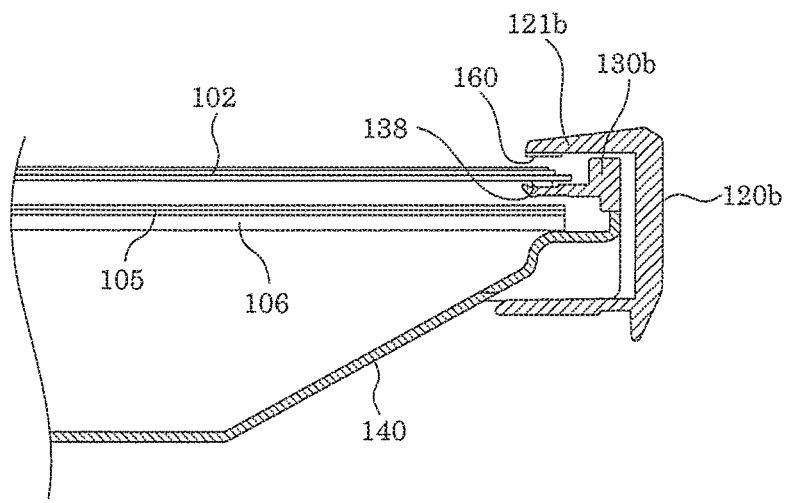
FIG. 6 is a cross-sectional view of a cross-section VI-VI in FIG. 4.
Figure 7:
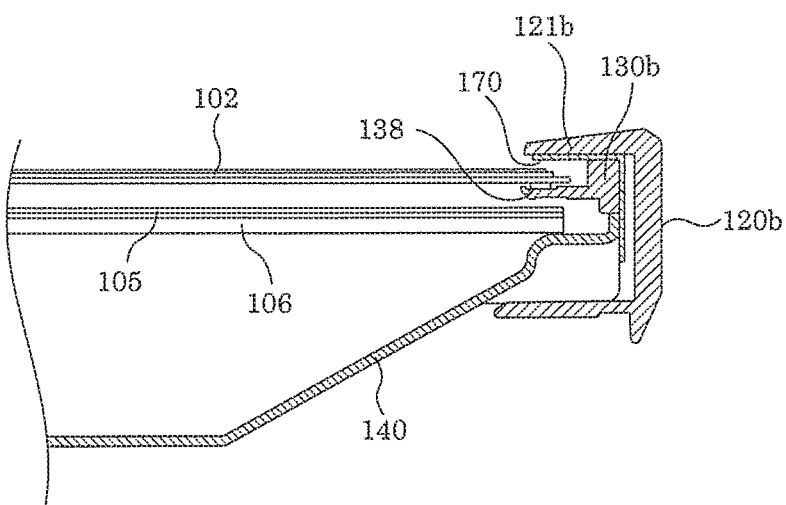
FIG. 7 is a cross-sectional view of a cross-section VII-VII in FIG. 4.

FIG. 6 is a cross-sectional view of a cross-section VI-VI in FIG. 4, and FIG. 7 is a cross-sectional view of a cross-section VII-VII in FIG. 4. Note that in both FIG. 6 and FIG. 7, other elements such as reflection sheet 108 and luminance-uniforming sheet 107 are not illustrated.

Figure 8:
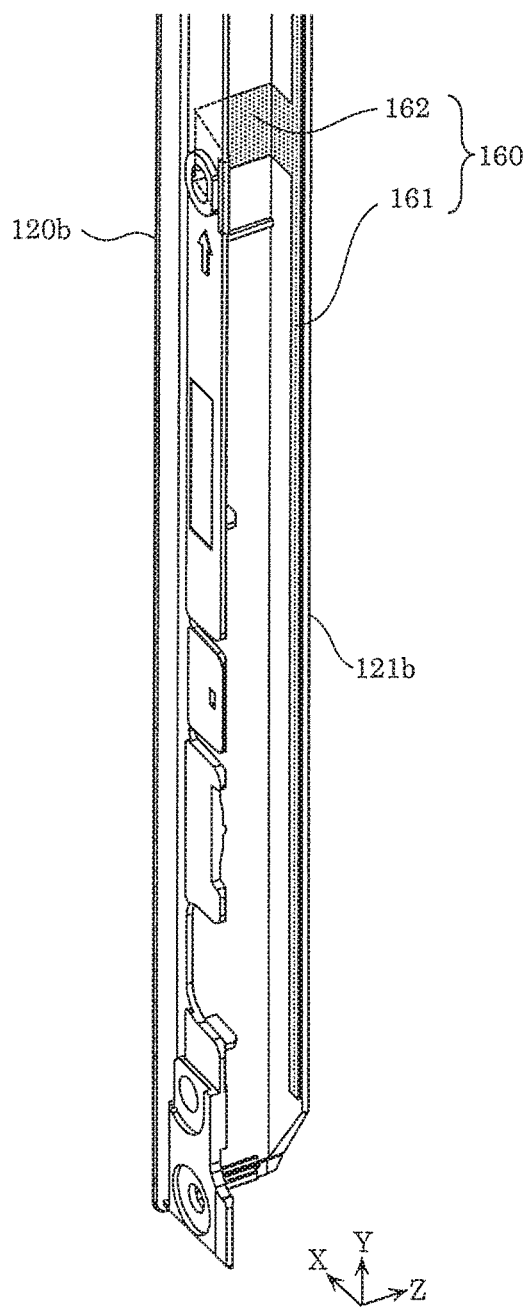
FIG. 8 is a perspective view of an example placement of a first conductor according to the embodiment.
Figure 9:
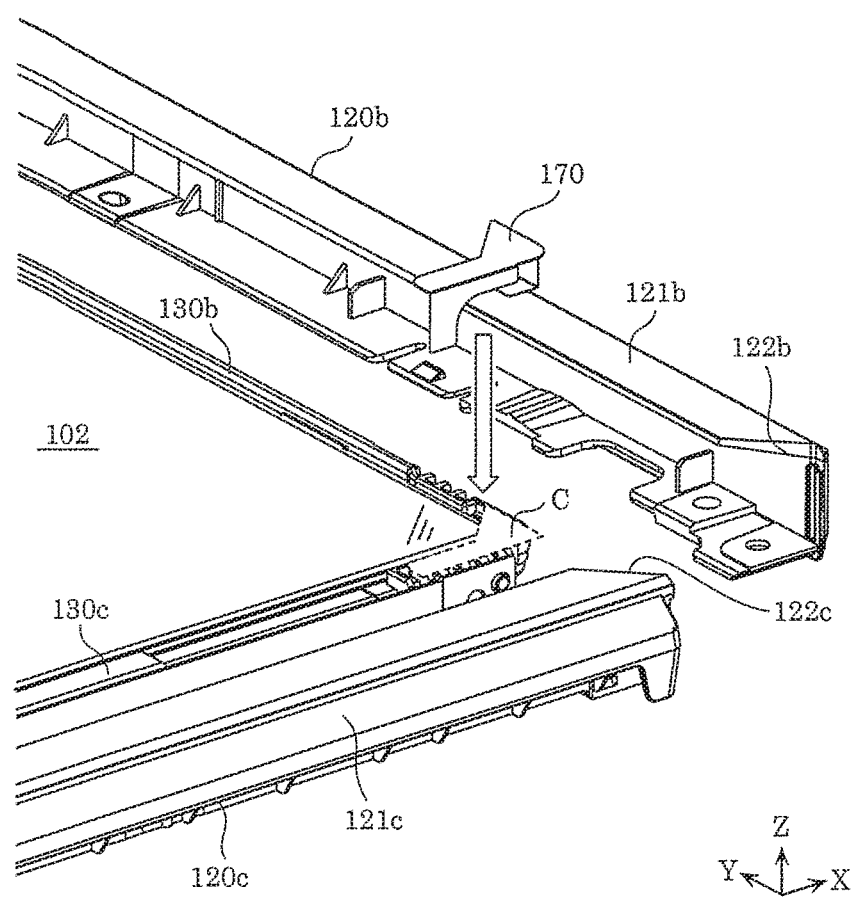
FIG. 9 is a perspective view of an example placement of a second conductor according to the embodiment.
Figure 10A:
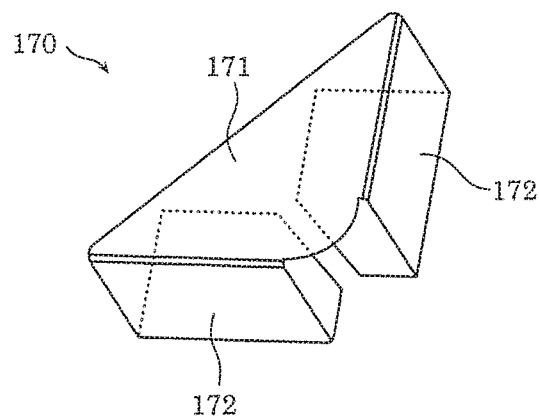
FIG. 10A is a perspective view of a configuration of the second conductor according to the embodiment.
Figure 10B:
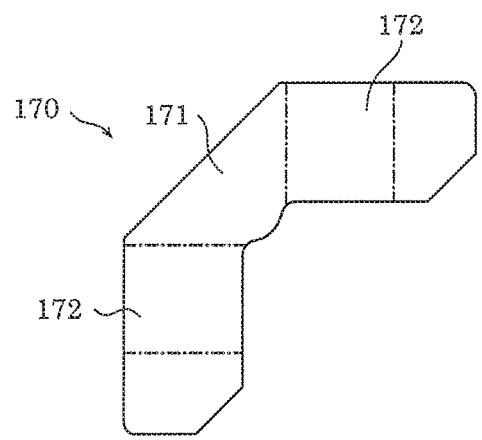
FIG. 10B is a developed view of the configuration of the second conductor according to the embodiment.
Figure 10C:
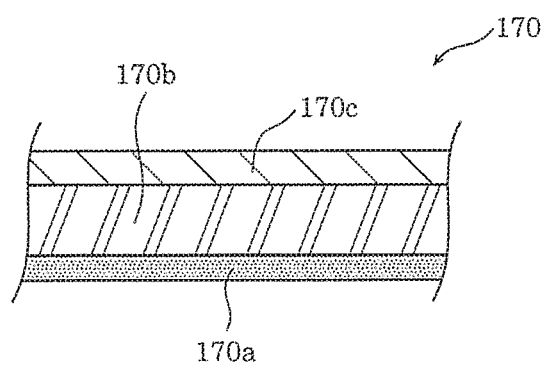
FIG. 10C is a view of a laminated structure of the second conductor according to the embodiment.

FIG. 8 is a perspective view of an example placement of first conductor 160 according to the embodiment. FIG. 9 is a perspective view of an example placement of second conductor 170 according to the embodiment. FIG. 10A is a perspective view of the configuration of second conductor 170 according to the embodiment, and FIG. 10B is a developed view of the configuration of second conductor 170 according to the embodiment. FIG. 10C is a view of the laminated structure of second conductor 170 according to the embodiment.

As illustrated in FIG. 4, four cover components (120a to 120d) enclose the periphery of display panel 102 in the front view. Moreover, a cross-section of each of four cover components (120a to 120d) perpendicular to an extension of a corresponding one of the four cover components is a U-shape as illustrated in FIG. 6 for example. In other words, a structure can be used in which an inside of the U-shaped cross section of bezel 120 accommodates the outer edges of components such as display panel 102 and back frame 140, since bezel 120 includes a plurality of cover components. With this, for example, the screws necessary for attaching the different components to back frame 140 when liquid crystal module 100 is split up front to back, bezel 120 clamping display panel 102, are no longer necessary. With this, the frame of liquid crystal module 100 can easily be made thinner. Note that display panel 102, as illustrated in FIG. 6 and FIG. 7, is supported by molded frame 130 (R_frame component 130b in FIG. 6 and FIG. 7) through cushion 138 on the inside of the U-shaped cross section of bezel 120.

Moreover, when taking a closer look at a joint of the two cover components, there is a slight gap between the two cover components (R_cover component 120b and B_cover component 120c in FIG. 5), as illustrated in FIG. 5 for example. With this, even when each cover component is expanded by heat, for example, distortions in bezel 120 as a whole are prevented.

However, various problems may occur due to bezel 120 including the plurality of cover components and the joint of the two cover components having a gap.

To be specific, a surface of bezel 120 facing display panel 102 (in other words the rear surface of front surface region 121) needs conductors such as conductive tape. The conductors eliminate static electricity in case static electricity is applied to display panel 102, and with this, malfunctions in display panel 102 due to static electricity are prevented.

Moreover, in order to eliminate static electricity efficiently or reliably, an electric charge that is accumulated in the conductive tape needs to be discharged efficiently to the outside. In regard to this, when, for example, rectangular ring-shaped conductive tape is disposed in bezel 120, the electric charge can be discharged from the conductive tape to back frame 140 by means of one conduction path that connects to hack frame 140 from either position on the rectangular ring.

In the present embodiment, however, bezel 120 includes seams (joints) in four places along the extensions since bezel 120 includes four cover components (120a to 120d). Moreover, the cross-section of cover component 120b that is perpendicular to the extension of bezel 120 is U-shaped as illustrated in FIG. 6 for example, and as described above, the inside of the U-shaped cross section can accommodate the outer edges of components such as display panel 102 and back frame 140.

Thus, after four cover components (120a to 120d) have been joined together, it is substantially impossible to provide a rectangular ring-shaped conductor on the surface of bezel 120 facing display panel 102 (the rear surface of front surface region 121).

Accordingly, in the present embodiment, a plurality of conductors for eliminating static electricity on display panel 102 are disposed in bezel 120, and a conduction path to back frame 140 is disposed at each conductor.

To be specific, first conductor 160 that is strip-shaped is disposed in each of four cover components (120a to 120d). For example, as illustrated in FIG. 5, first conductor 160 is disposed in both R_cover component 120b and B_cover component 120c. Moreover, second conductor 170 overlaps the joint (the end portion of each of the two cover components abutting each other in the front view) of R_cover component 120b and B_cover component 120c that is one corner of bezel 120.

More specifically, as illustrated in FIG. 6 and FIG. 8, first conductor 160 is, for example, fixed to a surface of R_cover component 120b (the rear surface of front surface region 121b) facing display panel 102. Moreover, first conductor 160 includes linear section 161 along the right side of display panel 102 in the front view, and first extension section 162 that extends from linear section 161 to a position at which first extension section 162 is in contact with back frame 140. In other words, a part of the static electricity applied to display panel 102 is eliminated by linear section 161, and with this, the electric charge on linear section 161 is discharged to back frame 140 that is made of metal through first extension section 162. Note that the wiring of back frame 14 is, for example, grounded during regular usage. With this, first conductor 160 disposed on R_cover component 120b can efficiently eliminate static electricity. Moreover, first conductor 160, having the above configuration, is also disposed on each of other cover components (120a, 120c, and 120d). In other words, each of three other first conductors 160 can discharge the electric load to back frame 140 through first extension section 162.

Moreover, since the conductor cannot be fixed to the joint of the two cover components, the conductor is fixed to molded frame 130. For example, as illustrated in FIG. 7 and FIG. 9, second conductor 170 is disposed at area C that includes the joint of R_frame component 130b and B_frame component 130c.

More specifically, second conductor 170 includes, as illustrated in FIG. 10A and FIG. 10B, corner section 171 that is substantially triangular and is disposed in a position that faces the corner of display panel 102, and second extension section 172 that extends from corner section 171 to a position at which second extension section 172 is in contact with back frame 140. In other words, a part of the static electricity applied to display panel 102 is eliminated by corner section 171, and with this, the electric charge on corner section 171 is discharged to back frame 140 that is made of metal through second extension section 172. With this, second conductor 170 disposed in one corner of molded frame 130 can efficiently eliminate static electricity. Moreover, second conductor 170, having the above configuration, is also disposed in the three other corners (top right corner, top left corner, bottom left corner) of molded frame 130. In other words, each of three other conductors 170 can discharge the electric charge to back frame 140 through second extension section 172.

With the above configuration, the conductors can be uninterruptedly disposed at the outer edges of display panel 102, and a conduction path from each of the conductors to back frame 140 that is made of metal is also ensured. Therefore, static electricity applied to display panel 102 is eliminated reliably or efficiently.

Moreover, in the present embodiment, second conductor 170 also functions as a component that prevents light leakage from the seams of the cover components. To be specific, second conductor 170 has a structure, as illustrated in FIG. 10C, in which aluminum layer 170b that is conductive, and polyethylene terephthalate (PET) layer 170c that is colored black to block light are laminated above adhesive layer 170a. In other words, second conductor 170 blocks light.

Second conductor 170 that blocks light overlaps, as illustrated in for example FIG. 5, the joint of the two corner components (R_cover component 120b and B_cover component 120c in FIG. 5) in the front view. To be specific, there is a slight gap, as illustrated in FIG. 9, between edge surface 122b of front surface region 121b of R_cover component 120b and edge surface 122c of front surface region 121 of B_cover component 120c. In the front view, second conductor 170 overlaps the gap.

Thus, even when the plurality of LEDs on LED sheet 109 emit light to the gaps, the light is blocked by second conductor 170. In other words, light leakage from the gaps is prevented. Moreover, since second conductor 170 that prevents this type of light leakage is concealed by bezel 120, problems such as damage by external factors or detraction from aesthetics do not occur. Note that second conductors 170 also prevent light leakage in the other three corners of bezel 120.

Moreover, molded frame 130 according to the present embodiment has a structure that contributes to preventing the above light leakage. This structure will be described with reference to FIG. 11A and FIG. 11B.

(1-4. Corner Structure of Molded Frame)

Figure 11A:
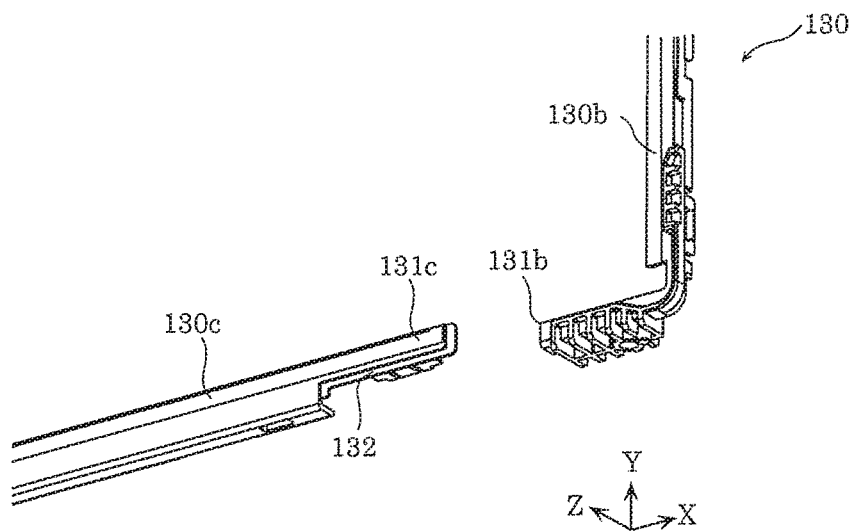
FIG. 11A is a first view of a bottom right corner of the molded frame according to the embodiment.
Figure 11B:
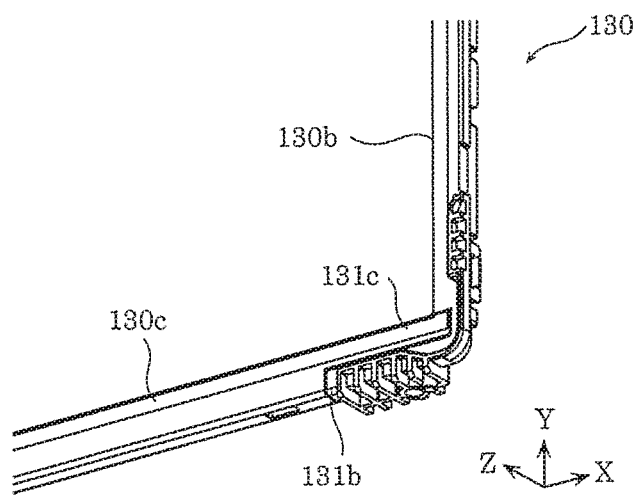
FIG. 11B is a second view of a bottom right corner of the molded frame according to the embodiment.

FIG. 11A is a first view of the bottom right corner of molded frame 130 according to the embodiment, and FIG. 11B is a second view of the bottom right corner of molded frame 130 according to the embodiment. To be specific, FIG. 11A is a perspective view of R_frame component 130b and B_frame component 130c before being connected, and FIG. 11B is a perspective view of R_frame component 130b and B_frame component 130c after being connected.

As illustrated in FIG. 11A and FIG. 11B, the bottom right corner of molded frame 130 is formed by connecting longitudinal end portion 131b of R_frame component 130b and longitudinal end portion 131c of B_frame component 130c to each other.

Here, in the present embodiment, R_frame component 130b and L_frame component 130d that constitute a right-hand side and a left-hand side of molded frame 130 each have protrusions aimed inwards on a top part and a bottom part, as illustrated in FIG. 3 for example. The protrusions partially overlap front to back (Z-axis) frame components (130a and 130c) that constitute an upper side and a lower side of molded frame 130. Moreover, the partially overlapping parts include a thin region on at least one of the two frame components, thickness remaining equal to other parts.

For example, when taking a closer look at the bottom right corner of molded frame 130, end portion 131b of R_frame component 130b protrudes inwards (X-minus axis). With this, the position of the joint of end portion 131b of R_frame component 130b and end portion 131c of B_frame component 130c are displaced from the position of the joint of R_cover component 120b and B_cover component 120c in the front view. With this, supposing there is light leakage from the joint of end portion 131b of R_frame component 130b and end portion 131c of B_frame component 130c, the chance of the leaked light reaching the gap between R_cover component 120b and B_cover component 120c is reduced. In other words, light leakage can be prevented with the position of the joint of the frame components being displaced from the position of the joint of the cover components in the front view.

Note that the above light leakage can also be prevented by having the left and right end portions of frame components (130a and 130c) that constitute the upper side and the lower side of molded frame 130 protrude inwards (center on the vertical axis). However, the cost of a mold for manufacturing molded frame 130 can, for example, be reduced by having the top and bottom end portions of frame components (130b and 130d) that constitute the short sides of rectangular-ring shaped molded frame 130 protrude inwards.

Moreover, as illustrated in FIG. 11A, in the present embodiment, thin region 132 is disposed at end portion 131c of B_frame component 130c. Thin region 132 partially overlaps end portion 131b of R_frame component 130b front to back (Z-axis). Thus, light leakage from the joint of end portion 131b of R_frame component 130b and end portion 131c of B_frame component 130c is prevented without increasing the thickness thereof.

Note that the structure of the bottom right corner of molded frame 130 as described above is also used in the other three corners of molded frame 130.

Moreover, liquid crystal module 100 according to the present embodiment has a structure that allows positioning of the frame components to be performed at the time of manufacture. The configuration relating to the positioning of the frame components will be described with reference to FIG. 12.

(1-5. Structure Relating Positioning of Frame Components)

Figure 12:
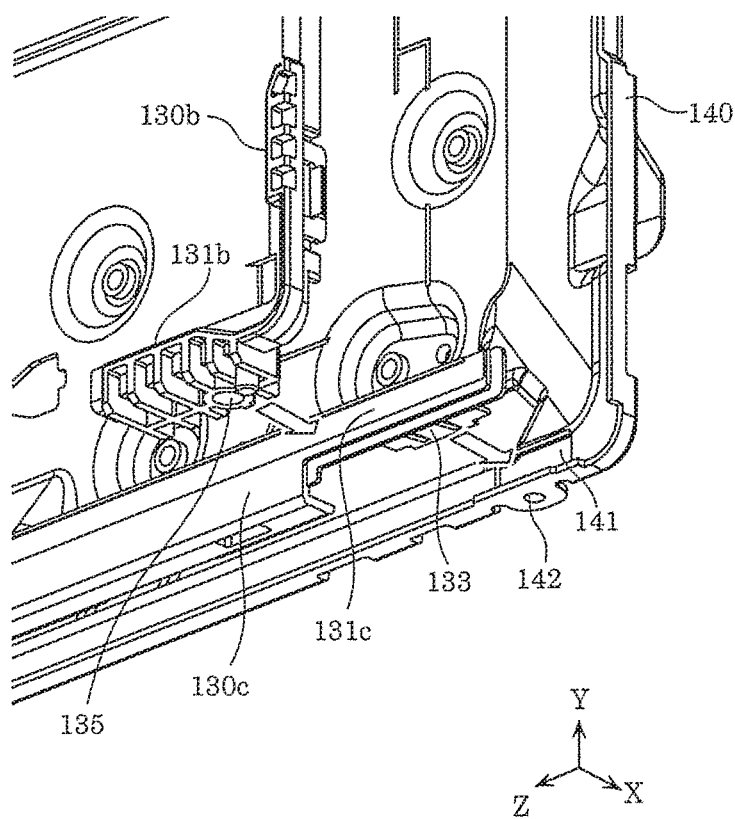
FIG. 12 is a perspective view of a structure relating to a positioning of a frame component according to the embodiment.

FIG. 12 is a perspective view of a structure relating to the positioning of the frame components according to the embodiment. To be specific, in FIG. 12 is an exploded perspective view of the structure of the positioning of B_frame component 130c in regard to back frame 140.

As illustrated in FIG. 12, a part including threaded hole 142 for anchoring molded frame 130 (R_frame component 130b in FIG. 12) to back frame 140, is lanced from sheet metal. As a result, a base of the lanced part includes through-hole 141.

In the present embodiment, the positioning of the frame components is performed using through-hole 141 at the time of manufacture of liquid crystal module 100. To be specific, as illustrated in FIG. 12, protrusion 133 that is inserted into through-hole 141 is disposed on end portion 131c of B_frame component 130c, corresponding with a position of through-hole 141.

For example, protrusion 133 of B_frame component 130c is inserted into through-hole 141 in back frame 140 when B_frame component 130c is attached to back frame 140 at the time of manufacture of liquid crystal module 100. With this, B_frame component 130c is attached to back frame 140 after the positioning of B_frame component 130c on back frame 140 has been decided.

Moreover, R_frame component 130b is attached to back frame 140 to which B_frame component 130c has been attached. With this, as described with reference to FIG. 11A and FIG. 11B, end portion 131c of B_frame component 130c and end portion 131b of R_frame component 130b are connected to each other, end portion 131c and end portion 131b partially overlapping front to back (Z-axis). In other words, the plurality of frame components are attached in a regular position to back frame 140.

Note that in the present embodiment, threaded hole 135 is disposed in end portion 131b of R_frame component 130b, and a screw (not illustrated in the drawings) that extends through threaded hole 135 is screwed into threaded hole 142 in back frame 140. With this, R_frame component 130b is screwed onto back frame 140.

Moreover, in the present embodiment, molded frame 130 includes an engagement section that engages with back frame 140. The engagement section of molded frame 130 will be described with reference to FIG. 13A and FIG. 13B.

(1-6. Engagement Section of Molded Frame)

Figure 13A:
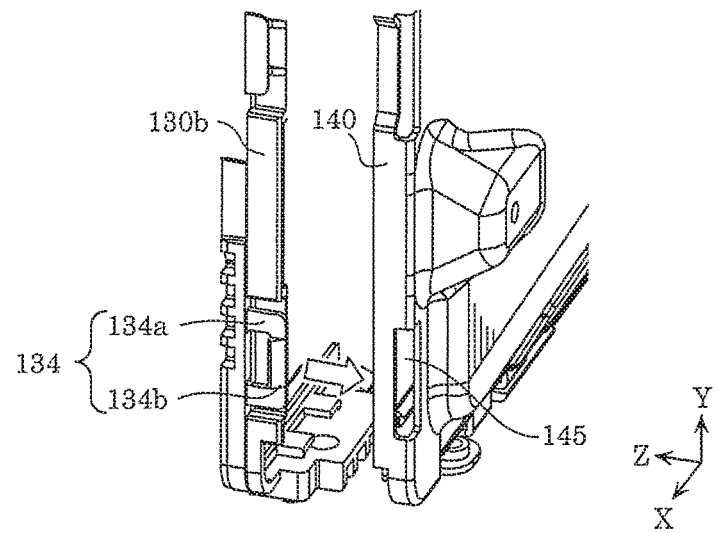
FIG. 13A is a perspective view of a configuration of an engagement section included in the molded frame according to the embodiment.
Figure 13B:
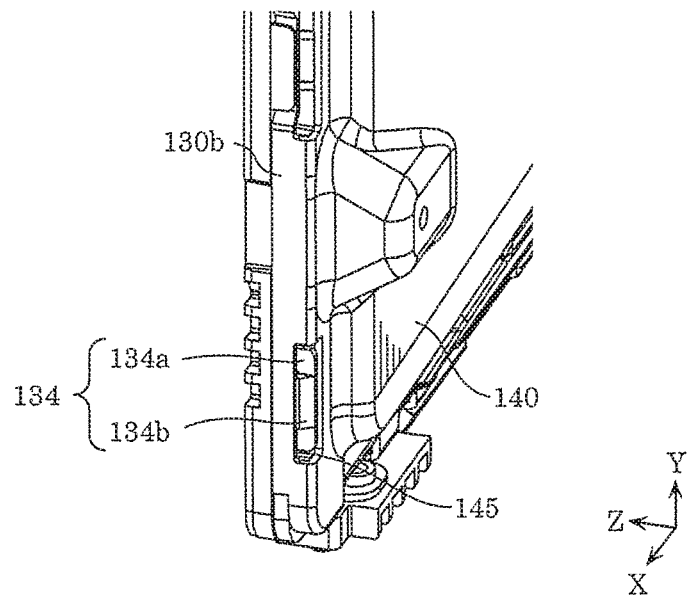
FIG. 13B is a perspective view of the engagement section of the molded frame engaged with an engagement hole in a back frame according to the embodiment.

FIG. 13A is a perspective view of a configuration of engagement section 134 included in molded frame 130 according to the embodiment. FIG. 13B is a perspective view of engagement section 134 of molded frame 130 according to the embodiment engaged with engagement hole 145 in back frame 140.

To be specific, in FIG. 13A, engagement section 134 included in R_frame component 130b is illustrated; and in FIG. 13B, R_frame component 130b attached to back frame 140 is illustrated.

As illustrated in FIG. 13A, engagement section 134 includes U-shaped base 134a, and hook 134b on an end portion of base 134a that is hooked into back frame 140. When R_frame component 130b is attached to back frame 140, base 134a of engagement section 134 is inserted into engagement hole 145 in back frame 140 while deforming elastically. Subsequently, when hook 134b has extended through engagement hole 145, base 134a returns to an initial orientation due to a restoring force, and as a result, hook 134b hooks into outer edges of engagement hole 145, as illustrated in FIG. 13B. In other words, engagement section 134 of R_frame component 130b engages with back frame 140.

Here, conventional ribs with a hook for engaging the molded frame to the back frame are solid. In other words, the part (rib) corresponding with base 134a in FIG. 13A is conventionally plate-shaped without a hole. However, with image display apparatuses becoming thinner, the height of ribs with a hook has become more restricted, and there is more demand for shorter ribs with a hook. As ribs with a hook become shorter, a plate spring thereof becomes more rigid, and the ribs with a hook are susceptible to damage due to a hardness thereof when the molded frame is attached to the back frame.

Accordingly, in the present embodiment, by making the rib of the rib with a hook (in other words, base 134a) into a hollow U-shape (including a hole), the plate spring of base 134a is prevented from being unnecessarily rigid. With this, when engagement section 134 is engaged with back frame 140, engagement section 134 has adequate spring force, and as a result, engagement section 134 is not susceptible to damage, and molded frame 130 and back frame 140 can be coupled to each other with adequate spring force. Moreover, when engagement section 134 is engaged with engagement hole 145 in back frame 140, engagement section 134 gives an pertinent clicking feel.

Note that in the present embodiment, a plurality of engagement sections 134 are disposed on each of four frame components (130a to 130d), and this enables molded frame 130 as a whole to be attached to back frame 140 more easily or reliably.

(1-7. Advantageous Effects, Etc.)

As described above, liquid crystal module 100 according to the present embodiment includes display panel 102 that displays an image on the front surface; back frame 140 disposed behind display panel 102; bezel 120 along the periphery of display panel 102 that includes front surface region 121 disposed frontward of display panel 102, and is fixed to back frame 140; and molded frame 130 disposed along the outer edges of display panel 102 that support display panel 102 from behind. Bezel 120 includes the first cover component (for example, R_cover component 120b) and the second cover component (for example, B_cover component 120c) that are separate from each other and correspond to two adjacent sides of display panel 102 in the front view, the second cover component being connected to the end portion of the first cover component. R_cover component 120b and B_cover component 120c each include first conductor 160 on the surface of front surface region 121 facing display panel 102, first conductor 160 including first extension section 162 that extends to the position at which first extension section 162 is in contact with back frame 140. Second conductor 170 that overlaps the joint of R_cover component 120b and B_cover component 120c in the front view is disposed on molded frame 130, second conductor 170 including second extension section 172 that extends to the position at which second extension section 172 section is in contact back frame 140.

In this manner, in the present embodiment, bezel 120 includes the plurality of cover components corresponding a plurality of sides of display panel 102. Thus, for example, even when the width of the frame is made smaller when bezel 120 has become larger with the increase in size of display panel 102 or to meet the demand, for thinner frames, problems such as an increase in handling issues of bezel 120 during the manufacturing process of liquid crystal module 100, a reduction in space efficiency when storing a plurality of bezels 120, or a reduction in transport efficiency when transporting the plurality of bezels 120 will not arise easily.

Moreover, since bezel 120 includes the plurality of cover components, the conductors for eliminating static electricity on display panel 102 are disposed on each of the cover components, the conductors in each cover component including a path (first extension section 162) for being in conduction with back frame 140. Furthermore, second conductor 170 overlaps the joint of the two cover components and also includes a path (second extension section 172) for being in conduction with back frame 140. Therefore, in liquid crystal module 100 according to the present embodiment, conductors can be uninterruptedly disposed at the outer edges of display panel 102, and a conduction path from each of the conductors to back frame 140 that is made of metal is also ensured. Therefore, static electricity applied to display panel 102 is eliminated reliably or efficiently.

Moreover, even when gaps are disposed between the cover components taking into account expansion of the cover components by heat, light leakage from the gaps is prevented by having second conductor 170 on the gaps. In other words, second conductor 170 can function as a means to prevent light leakage. Thus, it is not necessary, for example, to place other components for preventing light leakage from the gaps of the cover components.

As described above, liquid crystal module 100 according to the present embodiment enables the frame to be made thinner and to be manufactured more efficiently.

Moreover, in the present embodiment, molded frame 130 includes the first frame component (for example, R_frame component 130b) and the second frame component (for example, B_frame component 130c) that are coupled by connecting the respective longitudinal end portions of the first frame component and second frame component to each other.

In this manner, in the present embodiment, molded frame 130 also includes the plurality of frame components. Thus, for example, even when molded frame 130 has become larger with the increase in size of display panel 102, problems such as an increase in handling issues of molded frame 130 during the manufacturing process of liquid crystal module 100, a reduction in space efficiency when storing a plurality of molded frame 130, or a reduction in transport efficiency when transporting the plurality of molded frame 130 will not arise easily.

Moreover, in the present embodiment, the first frame component (for example, B_frame component 130c) includes thin region 132 on longitudinal end portion 131c. B_frame component 130c and the second frame component (for example, R_frame component 130b) are coupled to each other, thin region 132 of B_frame component 130c and longitudinal end portion 131b of R_frame component 130b overlapping at the joint of B_cover component 120c and R_cover component 120b.

In this manner, thin region 132 of B_frame component 130c overlaps end portion 131b of R_frame component 130b. Thus, for example, light leakage from the joint of end portion 131b of R_frame component 130b and end portion 131c of B_frame component 130c is prevented without increasing the thickness thereof. In other words, light leakage from the joint (seam) of the plurality of frame components, which results from molded frame 130 consisting of the plurality of frame components, can be prevented without the use of other components.

Moreover, in the present embodiment, at least the first frame component or the second frame component includes a protrusion that is inserted into through-hole 141 in back frame 140. To be specific, as illustrated in FIG. 12 for example, B_frame component 130c includes protrusion 133 that is inserted into through-hole 141 in back frame 140.

This enables easier positioning of B_frame component 130c in regard to back frame 140 when B_frame component 130c has been attached to back frame 140. This contributes to an enhancement in the manufacturing efficiency of liquid crystal module 100.

Moreover, in the present embodiment, since the hole in the base of the lanced part that includes threaded hole 142 in back frame 140 is used as through-hole 141 for the positioning of the frame components, a separate positioning hole does not need to be disposed in back frame 140.

Moreover, in the present embodiment, at least the first frame component or the second frame component includes engagement section 134 that engages with back frame 140. Engagement section 134 includes U-shaped base 134a, and hook 134b on the end portion of base 134a that is hooked into back frame 140. To be specific, as illustrated in FIG. 13A for example, R_frame component 130b includes engagement section 134 that engages with engagement hole 145 in back frame 140.

In this manner, even when the height (span on Z-axis) of engagement section 134 is made smaller by forming base 134a that functions as the plate spring of engagement section 134 into a U-shape, base 134a is prevented from being unnecessarily rigid. In other words, even when the height of engagement section 134 is made smaller by making liquid crystal module 100 thinner for example, engagement section 134 can be engaged with engagement hole 145 without damaging and forcing engagement section 134.

(2. Other Embodiments)

The above embodiment has been described as an example of a technique disclosed in the present application. However, the technique in the present disclosure is not limited to the above embodiment; various changes, substitutions, additions, omissions, etc., may be made to the embodiment. Moreover, each component included in the above-described embodiment may be combined to achieve new embodiments. Next, other embodiments will be exemplified below.

For example, display panel 102 according to the embodiment is a liquid crystal cell that displays an image using the light of the plurality of LEDs on LED sheet 109 on the back surface of display panel 102. However, display panel 102 is not limited to the liquid crystal cell. For example, a self-luminescent display panel that does not need a backlight unit, such as an organic light-emitting (EL) display panel or a plasma display panel, may also be used for display panel 102.

Moreover, for example, an edge-lit backlight unit that emits light received on an edge surface of a light guide plate toward display panel 102 from a front surface of the light guide plate may also be disposed in liquid crystal module 100.

Moreover, for example, the shape and size of thin region 132 in FIG. 11A, protrusion 133 in FIG. 12, and engagement section 134 in FIG. 13A are each an example of such, and as long as each component has a size and shape with which normal functionality is achieved, the size and shape are not limited to what is illustrated in the drawings.

Moreover, in the present embodiment, bezel 120 and molded frame 130 are each split up into four components corresponding to the four sides of rectangular display panel 102 in the front view. However, the positions at which both bezel 120 and molded frame 130 are split up are not limited to the foregoing. For example, rectangular ring-shaped bezel 120 may also consist of two cover components by splitting up bezel 120 in the center of the left and right sides in the front view. Even when this is the case, bezel 120 is still easier to handle than when bezel 120 is handled as a single, integrated component. Moreover, for example, light leakage can also be prevented by providing conductors in positions at which the conductors overlap the joints (the seams between the cover components) in two positions on bezel 120 in the front view.

Moreover, in the present embodiment, a resin such as PC is used for a material of both bezel 120 and molded frame 130. However, a metal such as stainless steel (SUS) may also be used as the material. It is advisable for the four corners to be made of resin when metal is used for the four side parts (linear parts) of molded frame 130.

Moreover, in the present embodiment, liquid crystal module 100 is an apparatus that displays a still image and a moving image on image display apparatus 10. However, the configuration of liquid crystal module 100 may, for example, also be employed as a computer monitor for personal computers, a portable device such as a tablet or a smartphone, and the like.

The above embodiment has been presented as an example of the technique disclosed according to the present application. The accompanying drawings and the detailed description are provided for this purpose.

Therefore, the components described in the accompanying drawings and the detailed description may include, in addition to components essential to overcoming problems, components that are not essential to overcoming problems but are included in order to exemplify the technique described above. Thus, those non-essential components should not be deemed essential due to the mere fact that the non-essential components are illustrated in the accompanying drawings and described in the detailed description.

The above embodiment is an example of the technique in the present disclosure, and thus various modifications, substitutions, additions, and omissions are possible in the scope of the claims and equivalent scopes thereof.

INDUSTRIAL APPLICABILITY

The present disclosure is applicable to, for example, an image display apparatus for which there is a demand for a thinner frame. To be specific, the present disclosure is applicable to a television receiver, a monitor display, an electronic billboard, a tablet, a smartphone, or a table-embedded image display apparatus, and the like.

The invention claimed is:

1. An image display apparatus, comprising:
a display panel that displays an image on a front surface;
a back frame disposed behind the display panel;
a bezel disposed along outer edges of the display panel, the bezel including a front surface region disposed frontward of the display panel and being fixed to the back frame; and
a molded frame disposed along the outer edges of the display panel, the molded frame supporting the display panel from behind, wherein
the bezel includes a first cover component and a second cover component that each include a resin, the first cover component and the second cover component are separate from each other and correspond to two adjacent sides of the display panel in the front view, the second cover component being connected to an end portion of the first cover component,
the first cover component and the second cover component each include a first conductor disposed on a surface of the front surface region facing the display panel, the first conductor including a first extension section that extends to a position at which the first extension section is in contact with the back frame,
the first conductor is separate from the first cover component and the second cover component, and
a second conductor that overlaps a joint of the first cover component and the second cover component in the front view is disposed on the molded frame, the second conductor integrally including a second extension section that extends to a position at which the second extension section is in contact with the back frame.

2. The image display apparatus according to claim 1, wherein the molded frame includes a first frame component and a second frame component that are coupled by connecting a longitudinal end portion of the first frame component and a longitudinal end portion of the second frame component to each other.

3. The image display apparatus according to claim 2, wherein
the first frame component includes a thin region on the longitudinal end portion, and
the first frame component and the second frame component are coupled to each other, the thin region of the first frame component and the longitudinal end portion of the second frame component overlapping at the joint of the first cover component and the second cover component.

4. The image display apparatus according to claim 2, wherein at least one of the first frame component and the second frame component includes a protrusion that is inserted into a through-hole in the back frame.

5. The image display apparatus according to claim 2, wherein
at least one of the first frame component and the second frame component includes an engagement section that is engaged with the back frame, and
the engagement section includes a base that is U-shaped and a hook on an end portion of the base that is hooked into the back frame.

6. An image display apparatus; comprising:
a display panel that displays an image on a front surface;
a back frame disposed behind the display panel;
a bezel disposed along outer edges of the display panel, the bezel including a front surface region disposed frontward of the display panel and a back surface region disposed backward of the back frame, being fixed to the back frame, and the bezel having a U-shaped cross section which accommodates the outer edges of the display panel and outer edges of the back frame; and
a molded frame disposed along the outer edges of the display panel, the molded frame supporting the display panel from behind, wherein
the bezel includes a first cover component and a second cover component that are separate from each other and correspond to two adjacent sides of the display panel in the front view, the second cover component being connected to an end portion of the first cover component,
the first cover component and the second cover component each include a first conductor disposed on a surface of the front surface region facing the display panel, the first conductor being separate from the first cover component and the second cover component and including a first extension section that extends from the surface facing the display panel to a position at which the first extension section is in contact with the back frame and passes through an inside of the U-shaped cross section of the bezel, and
a second conductor that overlaps a joint of the first cover component and the second cover component in the front view is disposed on the molded frame, the second conductor including a second extension section that extends to a position at which the second extension section is in contact with the back frame.

* * * * *